United States Patent [19]

Wagner

[11] Patent Number: 4,787,064
[45] Date of Patent: Nov. 22, 1988

[54] CIRCUIT MODULE WITH INTERFACE CIRCUITS FOR CONNECTING TO PLURALITY OF BUSSES OPERATING IN DIFFERENT OPERATING MODES

[75] Inventor: Wolfgang Wagner, Munich, Fed. Rep. of Germany

[73] Assignee: Siemens Aktiengesellschaft, Berlin and Munich, Fed. Rep. of Germany

[21] Appl. No.: 928,704

[22] Filed: Nov. 10, 1986

Related U.S. Application Data

[63] Continuation of Ser. No. 839,813, Mar. 12, 1986, abandoned, which is a continuation of Ser. No. 562,864, Dec. 19, 1983, abandoned.

[30] Foreign Application Priority Data

Dec. 23, 1982 [DE] Fed. Rep. of Germany ....... 3247834

[51] Int. Cl.[4] .............................................. G06F 15/00
[52] U.S. Cl. ............................. 364/900; 340/825.89; 375/106
[58] Field of Search ... 364/200 MS File, 900 MS File; 365/233; 340/825, 825.03, 825.89; 307/231, 510, 511, 475, 479, 480, 517, 527, 247 R; 328/154; 375/106

[56] References Cited

U.S. PATENT DOCUMENTS

| 4,095,267 | 6/1978 | Morimoto | 364/200 |
|---|---|---|---|
| 4,145,749 | 3/1979 | Yoshimura et al. | 364/900 |
| 4,272,829 | 6/1981 | Schmidt et al. | 364/900 |
| 4,339,808 | 7/1982 | North | 328/154 X |
| 4,379,327 | 4/1983 | Tietjen et al. | 364/200 |
| 4,396,980 | 8/1983 | Hingarh | 364/200 |
| 4,409,671 | 10/1983 | Daniels et al. | 364/900 |
| 4,470,113 | 9/1984 | Diwa | 364/200 |
| 4,496,857 | 1/1985 | Chao | 307/475 |
| 4,503,490 | 3/1985 | Thompson | 364/200 |
| 4,525,639 | 6/1985 | Nonaka | 307/480 |

FOREIGN PATENT DOCUMENTS 0064667 6/1981 Japan .
0174755 10/1982 Japan .

Primary Examiner—Raulfe B. Zache
Assistant Examiner—Thomas C. Lee
Attorney, Agent, or Firm—Herbert L. Lerner; Laurence A. Greenberg

[57] ABSTRACT

Circuit module assembly, includes a circuit module, integrated circuits with a first set of operating characteristics disposed on the module, a bus having a second set of operating characteristics, contact elements connected to the bus for transmitting data, address and control signals. Switchable interface circuits disposed on the module and connected to the integrated circuits are to the contact elements for matching the signals to be transmitted through the contact elements to one of the sets of characteristics.

4 Claims, 2 Drawing Sheets

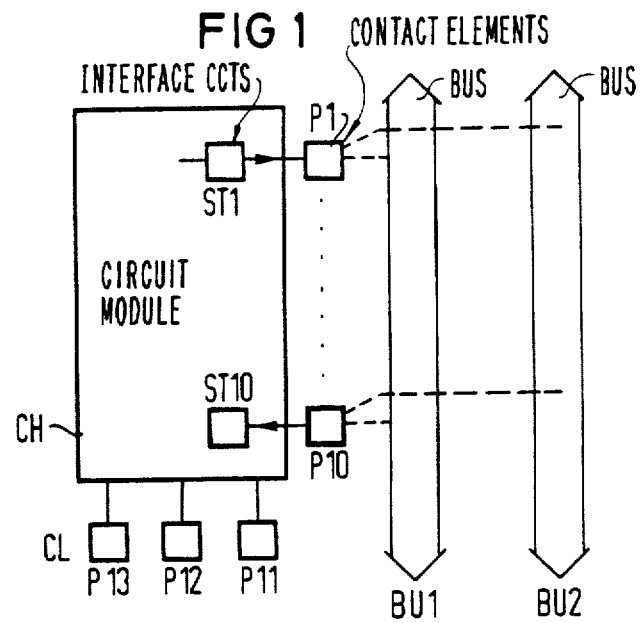
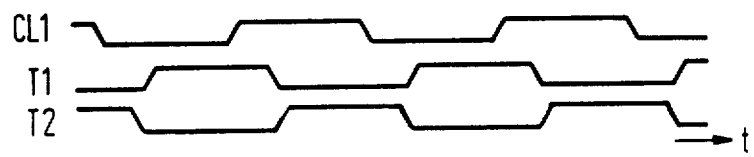
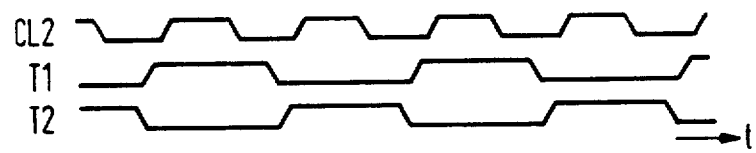

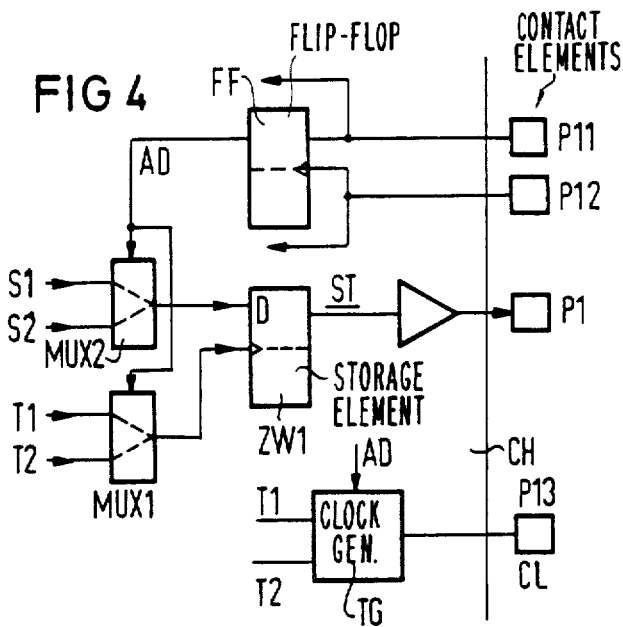
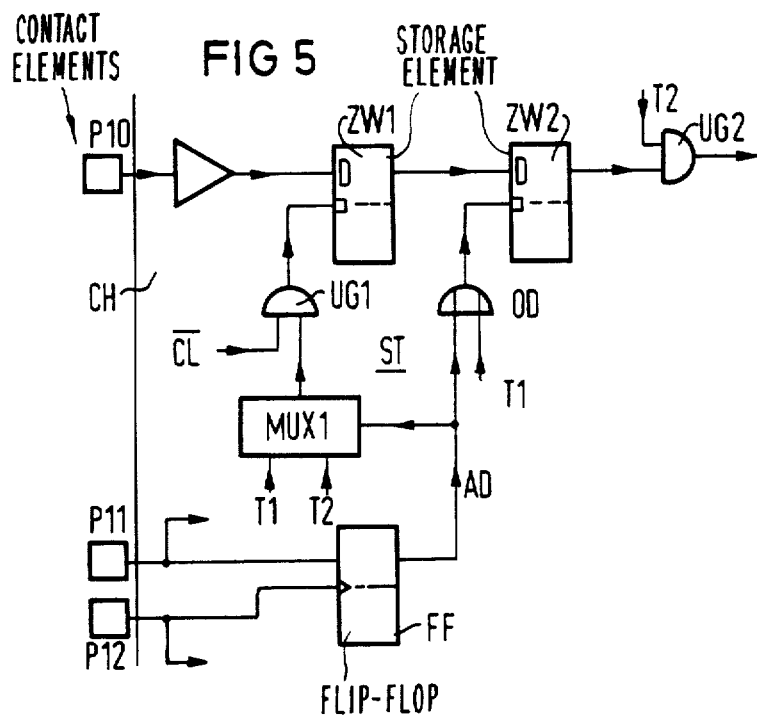

CIRCUIT MODULE WITH INTERFACE CIRCUITS FOR CONNECTING TO PLURALITY OF BUSSES OPERATING IN DIFFERENT OPERATING MODES

This application is a continuation of application Ser. No. 839,813, filed Mar. 12, 1986, now abandoned, which is a continuation of application Ser. No. 562,864, filed Dec. 19, 1983, now abandoned.

The invention relates to a circuit module with contact elements for connection to a bus, through which data, address or control signals are transmitted.

Circuit modules (chips) are connected to a bus by means of their contact elements, such as contact pins. Lines for data transmission, for address transmission and for the transmission of control signals are combined in the bus. A multiplicity of other circuit modules can be disposed in such a bus. In order to permit cooperation between these different modules, the signals to be transmitted through the bus must have definite, predetermined values and the bus, together with the modules, must be operated at a definite clock frequency. The circuits disposed on the modules are constructed accordingly, they operate at the system clock frequency and they deliver signals of the kind required by the bus. If such a module is to be connected to a bus, and the module has operating characteristics which have values for which the module was originally provided that are different than the bus, a matching circuit must be inserted between the module and the bus. This circuit ensures that the time relationships of the module are matched to the time relationships of the other modules connected to the bus and that the signal lines of the module are connected to the corresponding signal lines of the other modules.

It is accordingly an object of the invention to provide a circuit module which overcomes the hereinaforementioned disadvantages of the heretofore-known devices of this general type, and which can be connected to buses with different operating characteristics without the need for additional matching circuits.

With the foregoing and other objects in view there is provided, in accordance with the invention, a circuit module assembly, includes a circuit chip or module, integrated circuits with a first set of operating characteristics disposed on the module, a bus having a second set of operating characteristics, contact elements connected to the bus for transmitting data, address or control signals, and switchable interface circuits disposed on the module and connected to the integrated circuits and to the contact elements for matching the signals to be transmitted through the contact elements to one of the sets of characteristics.

In accordance with another feature of the invention there is provided a system clock signal source for delivering a frequency of a system clock signal associated with the bus, an address source for delivering an address associated with a desired mode of operation, and a clock generator having an input connected to the system clock signal source and outputs each delivering a respective internal clock signal obtained from the system clock signal, the interface circuits each including a multiplexer having inputs each connected to a respective one of the outputs of the clock generator for receiving a respective one of the internal clock signals, another input connected to the address source for receiving the address, and an output, and an intermediate memory having a transfer input connected to the output of the multiplexer for receiving one of the internal clock signals, and an output connected to one of the contact elements as an output for feeding the respective one internal clock signals to the respective one contact element in dependence on or as a function of the address which accordingly operates as an operating mode selection signal. With such an interface circuit chronological adaptation of the signals can be carried out.

A change in significance of the signals to be transmitted over the signal lines can be achieved in a simple manner if, in accordance with an additional feature of the invention, there is provided another multiplexer having an output connected to the intermediate memory, inputs for receiving respective further signals, and another input connected to the address source for feeding one of the further signals through the intermediate memory to the one contact element in dependence on or as a function of the address.

In accordance with an added feature of the invention there is provided another intermediate memory having an input connected to the output of the first-mentioned intermediate memory, and a transfer input for receiving another of the internal clock signals following the one internal clock signal fed to the transfer input of the first-mentioned intermediate memory.

In accordance with yet another feature of the invention there is provided an AND gate having an output connected the the transfer input of the first-mentioned intermediate memory, a first input connected to the output of the first-mentioned multiplexer, and a second input connected to the system clock signal source for receiving the system clock signal.

Since the number of contact elements per module is limited, it is advantageous to feed the address for the mode of operation through contact elements, to which another significance can also be assigned.

It accordance with a concomitant feature of the invention, the address source feeds the address to the multiplexers through a further one of the contact elements, and including a reset signal source connected through an additional one of the contact elements to the module for feeding a reset signal to the module while the address is being fed to the module, the contact elements being assigned to another task after the reset signal has ended.

Other features which are considered as characteristic for the invention are set forth in the appended claims.

Although the invention is illustrated and described herein as embodied in circuit module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is partially a diagrammatic view and partially a block circuit diagram of a circuit module with two buses;

FIG. 2 is a graph of a first waveform of clock signals plotted against time t;

FIG. 3 is a graph of another waveform of clock signals plotted against time t;

FIG. 4 is a block circuit diagram of a first embodiment of an interface circuit; and FIG. 5 is a block circuit diagram of a second embodiment of an interface circuit.

Referring now to the figures of the drawings in detail and first particularly to FIG. 1 thereof, it is seen that circuits are integrated in a conventional manner on a module (chip) CH. A DMA control, for instance, may be disposed on the module CH. The circuits on the chip CH are connected to a bus BU by contact elements Pi (where i=1, 2 etc.), so that signals, such as address signals, data signals and control signals can be fed to the circuits on the chip CH. Lines such as address lines, data lines and control signal lines are combined in the bus BU. Further modules which may have different structures are connected to such a bus BU. In order to permit cooperation between these modules, mutually related lines of the modules must be connected to each other through the bus, and the sequence of the transmission of the signals in time must be matched to each other. Accordingly, operating characteristics are associated with each bus, and the modules connected to the bus must comply with these characteristics in order to permit the cooperation between the modules.

If a module CH is to be connected to buses with different operating characteristics, such as to the bus BU 1 and to the bus BU 2, additional measures are required to adapt the signals generated by circuits on the module CH to the operating characteristics of the bus with respect to time and meaning. To this end according to FIG. 1, interface circuits ST are disposed on the module CH in the signal lines which lead to the buses. These interface circuits ST match the signals to be transmitted over the signal lines and the contact elements P to the buses BU with respect to time and they also ensure that the correct signal is fed to the correct bus line.

Two different timing diagrams are seen in FIG. 2 and FIG. 3, in which system clock pulses CL1 and CL2 of the buses BU1 and BU2, respectively, are shown as a first line. In the embodiments of FIGS. 2 and 3, the clock pulse CL1 has one-half the frequency of the clock CL2. The frequencies of these system clock pulses CL1 and CL2 which are applied to the module CH must be used to develop frequencies of internal clock pulses for the circuits disposed on the module CH, such as frequencies of internal clock pulses T1 and T2. In FIGS. 2 and 3, these pulses agree as to frequency.

Since, as shown in FIGS. 2 and 3, the frequencies of the system clock pulses CL can be different from the frequencies of the internal clock pulses T, cooperation between the module CH and the buses BU is only possible if the signals which are to be transmitted and which come from the module CH, are synchronized with the system clock pulse, or the signals coming from the buses BU are synchronized with the frequencies of the internal clock pulses. This is done by the interface circuits ST.

FIG. 4 shows a first embodiment of such an interface circuit ST. This interface circuit can preferably be used to match signals coming from the circuits on the module CH to the operating characteristics of the buses. In the embodiment it is assumed that only two buses BU1 and BU2 are to be connected to the module CH.

The interface circuit ST contains a first multiplexer MUX1 and an intermediate memory ZW1, such as a D-flipflop. The internal clock signals T1 and T2 are fed to inputs of the first multiplexer MUX1. An address AD associated with the buses BU1 and BU2, respectively, is fed to the first multiplexer MUX1 and this address AD causes the first multiplexers to switch either the frequency of the internal clock signal T1 or the frequency of the internal clock signal T2, to a transfer input of the first intermediate memory ZW1 being part of an interface circuit ST, i.e., to the control input of a firsts D-flipflop combined therewith. The flanks or sides of the internal clock pulses T1 or T2 can therefore fix the time at which the information present at the intermediate memory SW1 is transferred into the intermediate memory and is therefore present at the contact element P1. An amplifier of conventional construction is disposed between the intermediate memory ZW1 and the contact element P1.

The interface circuit ST of FIG. 4 can be expanded by means of a second multiplexer MUX2. This multiplexer MUX2 is inserted into the signal line leading to the D-input of the intermediate memory ZW1. Either a signal train S1 or a signal train S2 can be fed to the intermediate memory ZW1, depending on the address AD present at the multiplexer MUX2. The synchronization in time is again accomplished by means of the first multiplexer MUX1.

The internal clock pulses T1 and T2 are produced in a clock generator TG from the frequency of the operating clock pulse CL which is applied, for instance, to the contact element P13. The address AD is likewise fed to the clock generator TG. The clock generator TG is of conventional construction and in the case of FIG. 2 it delivers the operating clock frequency or it delivers the operating clock frequency in an inverted form, with a time delay; in the case of FIG. 3, the clock generator divides the operating clock frequency by 2 and then delivers the clock pulses T1 and T2 according to FIG. 2.

The address AD is applied to one of the contact elements, such as to the contact element P11. Since it is only necessary for the multiplexers MUX to switch only between two input lines, one contact element P11 is sufficient for supplying the address AD. The contact element P11 can be used for additional purposes if it is only necessary for the address AD to be applied to the contact element P11 for a limited time. The interval during which this occurs can be determined by a signal at the contact element P12. For instance, it is sufficient if the address AD is applied to the contact element P11 during the time, in which a reset signal for the module is present at the contact element P12. After the reset signal at the contact element P12 has disappeared, the contact element P11 can be used for other purposes, such as for transmitting an address bit. The address AD can then be stored in the interim in a flipflop FF.

FIG. 5 shows a further embodiment of the interface circuit which is preferably used to adapt signals coming from a bus to the internal timing conditions. Part of the interface circuit according to FIG. 5 is identical with that of FIG. 4. Again, a first multiplexer MUX1 is provided, at the inputs of which the internal clock signals T1 and T2 are present for determining the instant in time of storing the signal to be transmitted in dependence on an address AD. This instant in time can furthermore be fixed by connecting an AND gate UG1 between the first multiplexer MUX1 and the transfer input of the intermediate memory ZW1. The frequency of the system clock pulse CL is additionally fed to the AND gate UG1. The instant in time of the transfer of the signal into the intermediate memory ZW1 can further be made dependent on the system clock pulse CL in this manner.

If the signal with the frequency of the clock pulse T2 is to be transferred into the intermediate memory ZW1 but is to be passed on immediately with the frequency of the clock pulse T2 through the line to a circuit in the module CH, it is advisable to connect a further intermediate memory ZW2 such as a D-flipflop, at the output of the intermediate memory ZW1. The frequency of the clock pulse T1 is then applied to the transfer input of the second intermediate memory ZW2. An AND gate UG2 can be connected to the output of the second intermediate memory ZW2. The internal clock signal T2 is additionally fed to the AND gate UG2. Due to the interim storage of the signal to be transmitted in the intermediate memory ZW2, the transfer of a signal into the intermediate memory ZW1 and the passing-on of a signal, are decoupled.

If, on the other hand, the signal is to be stored in the intermediate memory ZW1, with the frequency of the clock pulse T1 but is to be passed on with the frequency of the clock pulse T2, then the intermediate memory ZW2 is unnecessary and the switch to a "pass" condition is made. This is accomplished by means of an OR gate OD1 which combines the line for the address AD and the line for the internal clock pulse T1 and connects them to the transfer input of the intermediate memory ZW2. The address AD and the internal clock signals T1 and T2 are obtained in accordance with FIG. 4.

If signals are transmitted through a contact element P in both directions, two respective interface circuits according to FIG. 4 or FIG. 5 are required.

In the embodiments of FIGS. 4 and 5, adaption in time is accomplished by means of two clock signals T1 and T2. It is, of course, also possible to use more than two clock signals for synchronization. Accordingly, the number of inputs of the multiplexer MUX1 must be then be increased and the address AD must be formed of not only one bit, but of several bits. The multiplexer MUX2 can likewise connect several inputs to the D-input of the intermediate memory ZW1.

The foregoing is a description corresponding, in substance, to German application P No. 32 47 834.8, dated Dec. 23, 1982, International priority of which is being claimed for the instant application, and which is hereby made part of this application. Any material discrepancies between the foregoing specification and the specification of the aforementioned corresponding German application are to be resolved in favor of the latter.

There is claimed:

1. Integrated circuit module for connection to at least two busses comprising: a plurality of contact elements for transmitting data, address and control signals to a plurality of busses operating in different operating modes; an operating mode selection signal being connected to said circuit module via one of said contact elements; a clock generator for generating a plurality of internal clock signals respective of said operating modes, an external system clock drivingly connected to said clock generator through another one of said contact elements; a plurality of interface circuits, each connected to a respective contact element; at least one of said interface circuits having a first intermediate memory; at least one of said interface circuits having a first multiplexer controlled by said operating mode selection signal for connecting a respective one of said internal clock signals to said first intermediate memory; said first intermediate memory being connected in the signal path of the bus signals between the respective contact element and the circuit module for intermediate storage of said data, address and control signals therein; and a second multiplexer having at least two signal inputs, of which at least one is connected to an input of the first intermediate memory, being responsive to the mode selection signal for controlling data access of the respective one of said signal inputs to said intermediate memory.

2. Integrated circuit module for connection to at least two busses comprising a plurality of contact elements for transmitting data, address and control signals to a plurality of busses operating in different operating modes; an operating mode selection signal being connected to said circuit module via one of said contact elements; a clock generator for generating a plurality of internal clock signals respective of said operating modes; an external system clock drivingly connected to said clock generator via another one of said contact elements; a plurality of interface circuits, each connected to a respective contact element; at least one of said interface circuits having a first intermediate memory having a clock input; at least one of said interface circuits having a first multiplexer controlled by said operating mode selection signal for connecting a first one of said internal clock signals to said first intermediate memory; said first intermediate memory being connected in the signal path of the bus signals between the respective contact element and the circuit module for intermediate storage of said data, address and control signals therein; a second intermediate memory connected to an output of said first intermediate memory and having a clock input for receiving the first internal clock; said first internal clock following in time a second internal clock, which is connected to the clock input of the first intermediate memory.

3. Integrated circuit module according to claim 2, including an AND-gate having first and second inputs connected between the output of the first multiplexer and the clock input of the first intermediate memory, and wherein the second AND-gate input is connected to the system clock.

4. Integrated circuit module according to claim 3, including a reset signal connected to still another connecting element, wherein said operating mode selection signal is present on said still other connecting element as long as said reset signal is active, and wherein said still other connecting element carrying said mode selection signal has a different function assigned thereto after said reset signal has become inactive.

* * * * *